(12) United States Patent
Villacorta et al.

(10) Patent No.: US 8,219,487 B2
(45) Date of Patent: Jul. 10, 2012

(54) SYSTEM AND METHOD FOR MANAGING CREDIT RISK FOR INVESTMENT PORTFOLIOS

(75) Inventors: Roland E. Villacorta, New York, NY (US); Scott J. Condron, Armonk, NY (US); Cheewee Chew, Princeton, NJ (US)

(73) Assignee: BlackRock, Inc., New York, NY (US)

( * ) Notice: Subject to any disclaimer, the term of this patent is extended or adjusted under 35 U.S.C. 154(b) by 2286 days.

(21) Appl. No.: 10/685,865

(22) Filed: Oct. 15, 2003

(65) Prior Publication Data
US 2005/0086155 A1    Apr. 21, 2005

(51) Int. Cl.
*G06Q 40/00* (2012.01)
(52) U.S. Cl. ......................................................... 705/38
(58) Field of Classification Search .................... 705/35, 705/36, 37, 38, 39
See application file for complete search history.

(56) References Cited

U.S. PATENT DOCUMENTS

| | | | |
|---|---|---|---|
| 5,132,899 A | | 7/1992 | Fox |
| 5,239,462 A | * | 8/1993 | Jones et al. ....................... 705/38 |
| 5,542,088 A | * | 7/1996 | Jennings et al. ................ 718/103 |
| 5,717,604 A | * | 2/1998 | Wiggins .......................... 709/229 |
| 5,784,696 A | | 7/1998 | Melnikoff |
| 5,812,988 A | | 9/1998 | Sandretto |
| 5,914,472 A | * | 6/1999 | Foladare et al. ................. 235/380 |
| 5,946,667 A | | 8/1999 | Tull, Jr. et al. |
| 5,991,743 A | | 11/1999 | Irving et al. |
| 6,061,662 A | | 5/2000 | Makivic |
| 6,088,686 A | * | 7/2000 | Walker et al. ..................... 705/38 |
| 6,112,190 A | * | 8/2000 | Fletcher et al. .............. 705/36 R |
| 6,249,775 B1 | | 6/2001 | Freeman et al. |
| 6,275,814 B1 | | 8/2001 | Giansante et al. |
| 6,360,210 B1 | | 3/2002 | Wallman |
| 6,393,409 B2 | | 5/2002 | Young et al. |
| 6,405,179 B1 | | 6/2002 | Rebane |
| 6,405,181 B2 | * | 6/2002 | Lent et al. ......................... 705/38 |
| 6,421,653 B1 | * | 7/2002 | May ............................. 705/36 R |
| 6,484,152 B1 | | 11/2002 | Robinson |
| 6,587,841 B1 | * | 7/2003 | DeFrancesco et al. .......... 705/38 |
| 7,089,207 B1 | * | 8/2006 | Lardy et al. ...................... 705/38 |
| 7,181,427 B1 | * | 2/2007 | DeFrancesco et al. .......... 705/38 |
| 7,472,088 B2 | * | 12/2008 | Taylor et al. ..................... 705/38 |
| 7,725,354 B2 | * | 5/2010 | Schwarze et al. ............. 705/26.8 |
| 2001/0037288 A1 | * | 11/2001 | Bennett et al. ................... 705/38 |
| 2002/0016758 A1 | * | 2/2002 | Grigsby ........................... 705/36 |
| 2002/0026401 A1 | * | 2/2002 | Hueler ............................. 705/37 |

(Continued)

OTHER PUBLICATIONS

Home Buying Institute: Get pre-approved for a mortgage loan, http://www.homebuyinginstitute.com/mortgageprocess_article3.php.*

(Continued)

*Primary Examiner* — Bijendra K Shrestha
(74) *Attorney, Agent, or Firm* — Edwards Wildman Palmer LLP; Scott D. Wofsy

(57) ABSTRACT

A system is disclosed for enabling a portfolio manager to obtain credit approval for an issuer of securities from a credit analyst. The system includes a relational database containing subjective and objective issuer information, a graphical user interface for permitting a portfolio manager to submit a credit approval request to a credit analyst, a graphical user interface for permitting a credit analyst to evaluate the credit approval request submitted by the portfolio manager based on the issuer information contained in the database, and a graphical user interface for permitting the credit analyst to resolve the credit approval request on behalf of the portfolio manager.

16 Claims, 18 Drawing Sheets

U.S. PATENT DOCUMENTS

| | | | |
|---|---|---|---|
| 2002/0087451 A1* | 7/2002 | Rieger et al. | 705/37 |
| 2002/0133365 A1* | 9/2002 | Grey et al. | 705/1 |
| 2002/0152161 A1* | 10/2002 | Aoike | 705/39 |
| 2003/0083984 A1* | 5/2003 | Crawford et al. | 705/38 |
| 2003/0117443 A1* | 6/2003 | Langner et al. | 345/810 |
| 2003/0167221 A1* | 9/2003 | Kochansky | 705/36 |
| 2003/0182215 A1* | 9/2003 | Ringler et al. | 705/35 |
| 2003/0195868 A1* | 10/2003 | Wilson et al. | 707/3 |
| 2003/0233292 A1* | 12/2003 | Richey et al. | 705/28 |
| 2004/0107152 A1* | 6/2004 | Marlowe-Noren | 705/35 |
| 2004/0158520 A1* | 8/2004 | Noh | 705/38 |
| 2005/0027645 A1* | 2/2005 | Lui et al. | 705/38 |
| 2005/0065874 A1* | 3/2005 | Lefner et al. | 705/38 |
| 2006/0277123 A1* | 12/2006 | Kennedy et al. | 705/35 |

OTHER PUBLICATIONS

Texas Bond Review Board: Bond Issues—A topics for the State of Texas Debt Issuing Community, Oct. 1997. pp. 1-12.*

Levin et al.: SEC Law—SEC approves new rules addressing research analyst conflict of interest, Advisory, Jun. 19, 2002, pp. 1-4.*

White, L: The Credit Rating Industry: An Industrial Organization Analysis, New York University, Jun. 1, 2001, pp. 1-40.*

* cited by examiner

FIG. 3

KIMBERLY - CLARK CORPORATION (KMB)

ISSUER ID: 494368

Corp. Structure
LEH Industry: Consumer Products
SIC code: Paper mills (2621)
Issuance Type: Corp/BHC-level Issuer Issuer Ratings: M / S / F
Aa2/AA/AA
P-1/A-1+/F1+

Parent: KIMBERLY-CLARK CORPORATION (494368)
Ultimate: KIMBERLY-CLARK CORPORATION (494368)

| Overview | Lists | Sectors | Research | Ratings | Related | Tree | Limits | Analytics | Corp. Actions | Equity | Audit |

Corporate and Fiscal Info
KIMBERLY-CLARK CORPORATION
P. O. BOX 619100
Dallas TX Texas 75261
US
www.kimberly-clark.com
972-281-1200

Fiscal Yr End: December
Year Inc: 1928
State Inc: Deleware
Country Inc: US
Primary Exch:

Tax Structure:
Private Company: No
In Bankrupcy: No
Debt Issued:

Corporate and Fiscal Info
13 securities, 12 credit enhancements

Market Info
Price: 45.45
Prev Close: 46.06
52-week High: 66.79
52-week Low: 45.30
Volume: 1,771.60

EPS: 3.02
EPS Growth (5Yr): 3.93
ROE (5Yr): 30.91
Market Cap: 23,406.75
Shares Outstanding: 515.00

Credit Enhancements

| Type Name | Cusip | Name | Start Date | Pct | Conditional Name | Expiration |
|---|---|---|---|---|---|---|
| Guarantor | 245901AA1 | DELEWARE CNTY PA IDA | 12/19/1984 | 100 | Direct Unconditional | 12/01/2018 |
| Guarantor | 245901AB9 | DELEWARE CNTY PA IDA | 12/19/1984 | 100 | Direct Unconditional | 12/01/2018 |
| Guarantor | 245901AC7 | DELEWARE CNTY PA IDA | 12/19/1984 | 100 | Direct Unconditional | 12/01/2018 |
| Guarantor | 245901AD5 | DELEWARE CNTY PA IDA | 12/19/1984 | 100 | Direct Unconditional | 12/01/2018 |
| Guarantor | 245901AE3 | DELEWARE CNTY PA IDA | 12/19/1984 | 100 | Direct Unconditional | 12/01/2018 |
| Guarantor | 30002KAA8 | EVERETT WASHINGTON | 11/11/1999 | 100 | Direct Unconditional | 12/01/2032 |
| Corporate Underlier | 245901AA1 | DELEWARE CNTY PA IDA | 12/19/1984 | 0 | Direct Unconditional | 12/01/2018 |
| Corporate Underlier | 245901AB9 | DELEWARE CNTY PA IDA | 12/19/1984 | 0 | Direct Unconditional | 12/01/2018 |
| Corporate Underlier | 245901AC7 | DELEWARE CNTY PA IDA | 12/19/1984 | 0 | Direct Unconditional | 12/01/2018 |
| Corporate Underlier | 245901AD5 | DELEWARE CNTY PA IDA | 12/19/1984 | 0 | Direct Unconditional | 12/01/2018 |
| Corporate Underlier | 245901AE3 | DELEWARE CNTY PA IDA | 12/19/1984 | 0 | Direct Unconditional | 12/01/2018 |
| Corporate Underlier | 30002KAA8 | EVERETT WASHINGTON | 12/09/1999 | 0 | Direct Unconditional | 12/01/2032 |

KIMBERLY - CLARK CORPORATION (KMB)

| Corp. Structure | LEH Industry: | Consumer Products | Issuer Ratings: | M / S / F | Parent: | KIMBERLY-CLARK CORPORATION (494368) |
| | SIC code: | Paper mills (2621) | | Aa2/AA/AA | Ultimate: | KIMBERLY-CLARK CORPORATION (494368) |
| | Issuance Type: | Corp/BHC-level Issuer | | P-1/A-1+/F1+ | | |

ISSUER ID 494368

Overview | Lists | Sectors | Research | Ratings | Related | Tree | Limits | Analytics | Corp. Actions | Equity | Audit Taxable

Taxable / Dependencies

| List Name | Action | Maturity Restriction | Source | Apply? |
|---|---|---|---|---|
| Primary | Add | ☐ | BFM | ☑ |
| First Tier | Add | ☐ | BFM | ☑ |
| SecondTier | Add | ☐ | BFM | ☐ |
| IDR | Add | ☐ | BFM | ☐ |
| Separate Account | Add | ☐ | BFM | ☐ |
| Grade 1 & 2 Credit Enhancers | Add | ☐ | BFM | ☐ |
| Grade 1 Credit Enhancers | Add | ☐ | BFM | ☐ |
| Grade 2 Credit Enhancers | Add | ☐ | BFM | ☐ |
| Grade 3 Credit Enhancers | Add | ☐ | BFM | ☐ |
| Grade 1 & 2 Corporate Underlier | Add | ☐ | BFM | ☐ |
| Grade 1 Corporate Underlier | Add | ☐ | BFM | ☐ |
| Grade 2 Corporate Underlier | Add | ☐ | BFM | ☐ |

FIG. 17

SYSTEM AND METHOD FOR MANAGING CREDIT RISK FOR INVESTMENT PORTFOLIOS

BACKGROUND OF THE INVENTION

1. Field of the Invention

The subject invention relates to financial portfolio management, and more particularly, to a system and method for managing credit risk as it relates to issuers of fixed income securities.

2. Background of the Related Art

Evaluating the credit risk associated with an issuer of fixed income securities is a critical aspect of portfolio management. Regardless of whether the issuer is public or private, foreign or domestic, small or large, portfolio managers need to assess the issuer's probability of default before a transaction can be executed. The probability of default or credit risk associated with an issuer is typically assessed using quantitative or objective financial data including capital structure, volatility, and asset value, related securities issued to or by the company, agency ratings and market analytics. Oftentimes, the credit risk or exposure associated with an issuer is evaluated using subjective or qualitative information such as analyst opinions and commentary from market observers.

It would be beneficial to provide a relational database containing subjective and objective information relating to issuers of fixed income securities, and to provide a web-based system and method which enables a credit analyst to readily access the information in the database to evaluate the credit worthiness and risk associated with an issuer of securities.

It would also be beneficial to provide a web-based system and method that enables portfolio managers and credit analysts to readily communicate with one another to obtain credit approval for an issuer of securities in an effective and efficient manner.

SUMMARY OF THE INVENTION

The subject invention is basically directed to a new and useful system for enabling a portfolio manager or trader to obtain credit approval for an issuer of securities from a credit analyst. The system includes a relational database containing information about issuers of securities in the form of subjective data and objective data. Means are provided for permitting a portfolio manager to submit a credit approval request to a credit analyst, and means are provided for broadcasting the credit approval request to the credit analyst for evaluation. The means for submitting a credit approval request includes a graphical user interface having a data entry field for entering a description of the request. Preferably, the graphical user interface permits a portfolio manager to assign a degree of relative importance to the credit approval request in another data entry field.

Means are also provided for permitting a credit analyst to evaluate the credit approval request submitted by the portfolio manager based on the issuer information contained in the database. This involves graphical user interfaces enabling ready access to information contained in the issuer database. The system further includes means for permitting the credit analyst to resolve the credit approval request on behalf of the portfolio manager. The means for permitting the credit analyst to resolve the credit approval request includes a graphical user interface accessible by the credit analyst for specifying a resolution to the credit approval request in a data field.

Preferably, the graphical user interface is adapted and configured to permit the credit analyst to resolve the credit approval request on behalf of the portfolio manager by adding an issuer to at least one list of approved issuers. In an embodiment of the subject invention, the system also includes means for providing the portfolio manager with status messages indicating the status of a credit approval request. Preferably, the means for providing status messages includes a graphical display providing color-coded status messages to the portfolio manager.

The subject invention is also directed to a system for enabling a portfolio manager to obtain credit approval for an issuer of securities from a credit analyst that includes means for submitting a credit approval request to a credit analyst, means for monitoring the status of the credit approval request, means for managing the status of the credit approval request, and means for resolving the credit approval request on behalf of the portfolio manager. Preferably, the means for submitting a credit approval request for an issuer includes a graphical user interface accessible by a portfolio manager for entering a description of the request in a data field, and the means for monitoring the status of the credit approval request includes a graphical display, which provides color-coded status messages viewable by the portfolio manager.

Preferably, the means for managing the status of the credit approval request includes a graphical user interface accessible by the credit analyst for specifying the status of the credit approval request in a data field, and the means for resolving the credit approval request includes a graphical user interface accessible by the credit analyst for specifying a resolution to the credit approval request in a data field. The resolution to the credit approval request is preferably selected from the group of actions consisting of adding an issuer to a list of approved issuers, restricting the maturity of an issuer, suspending an issuer, re-instating an issuer, or removing an issuer from a list of approved issuers.

The subject invention is also directed to a method of providing credit approval, which includes the steps of receiving a credit approval request from a portfolio manager, evaluating the credit approval request based upon objective and subjective information stored in a database, managing the status of the credit approval request, and resolving the credit approval request on behalf of the portfolio manager. In one instance, the credit approval request relates to an issuer of securities (e.g., a corporation or municipality). In another instance, the credit approval request relates to a particular security (e.g., an asset backed security or municipal security). Thus, the credit approval request can be resolved on behalf of the portfolio manager on an issuer level or on a security level. Preferably, the step of managing the status of the credit approval request includes communicating status messages to the portfolio manager, and the step of resolving the credit approval request includes communicating a resolution to the credit approval request to the portfolio manager.

These and other aspects of the system and method of the subject invention will become more readily apparent to those having ordinary skill in the art from the following detailed description of the invention taken in conjunction with the drawings.

BRIEF DESCRIPTION OF THE DRAWINGS

So that those having ordinary skill in the art to which the present invention pertains will more readily understand how to make and use the method and system of the present invention, embodiments thereof will be described in detail hereinbelow with reference to the drawings, wherein:

FIG. 3 is a depiction of a graphical user interface configured in accordance with a preferred embodiment of the subject invention that displays an overview for a selected issuer based on information from the issuer database including corporate and fiscal information, market information such as exchange closing prices and credit enhancements;

FIG. 7 is a depiction of a graphical user interface configured in accordance with a preferred embodiment of the subject invention that displays securities that are related to or issued by a selected issuer and that are stored in the issuer database;

FIG. 14 is a depiction of the graphical user interface of FIG. 13, with multiple rows of data presented, at a final stage of the credit approval process;

FIG. 15 is a depiction of a graphical user interface which enables an analyst to add an issuer to an approved credit list selected from a group of credit lists;

FIG. 17 is a depiction of the graphical user interface that enables an analyst to add an issuer to multiple credit lists.

DETAILED DESCRIPTION OF PREFERRED EMBODIMENTS

The subject invention is directed to a new and useful credit risk management system that is particularly adapted and configured to enable a portfolio manager, trader investor, agent or custodian to request and obtain credit approval for an issuer of financial securities (e.g., a corporation or municipality) prior to executing a transaction involving an issued security. The system is further adapted and configured to enable a credit analyst to evaluate/analyze a request for credit approval based upon subjective and objective data related to the issuer that has been compiled, organized and stored in a relational database.

Those skilled in the art will also readily appreciate that a credit risk management system configured in accordance with the present disclosure includes the various computer and network related software and hardware that may be used in a distributed computing network, that is, programs, operating systems, memory storage devices, input/output devices, data processors, servers with links to data communication systems, wireless or otherwise, such as those which take the form of a local or wide area network, and a plurality of data terminals within the network, such as personal computers. Those skilled in the art will further appreciate that, so long as its users are provided with access to a system and method constructed in accordance with the present disclosure, the type of network, software or hardware is not vital to its full implementation.

Figure 1:
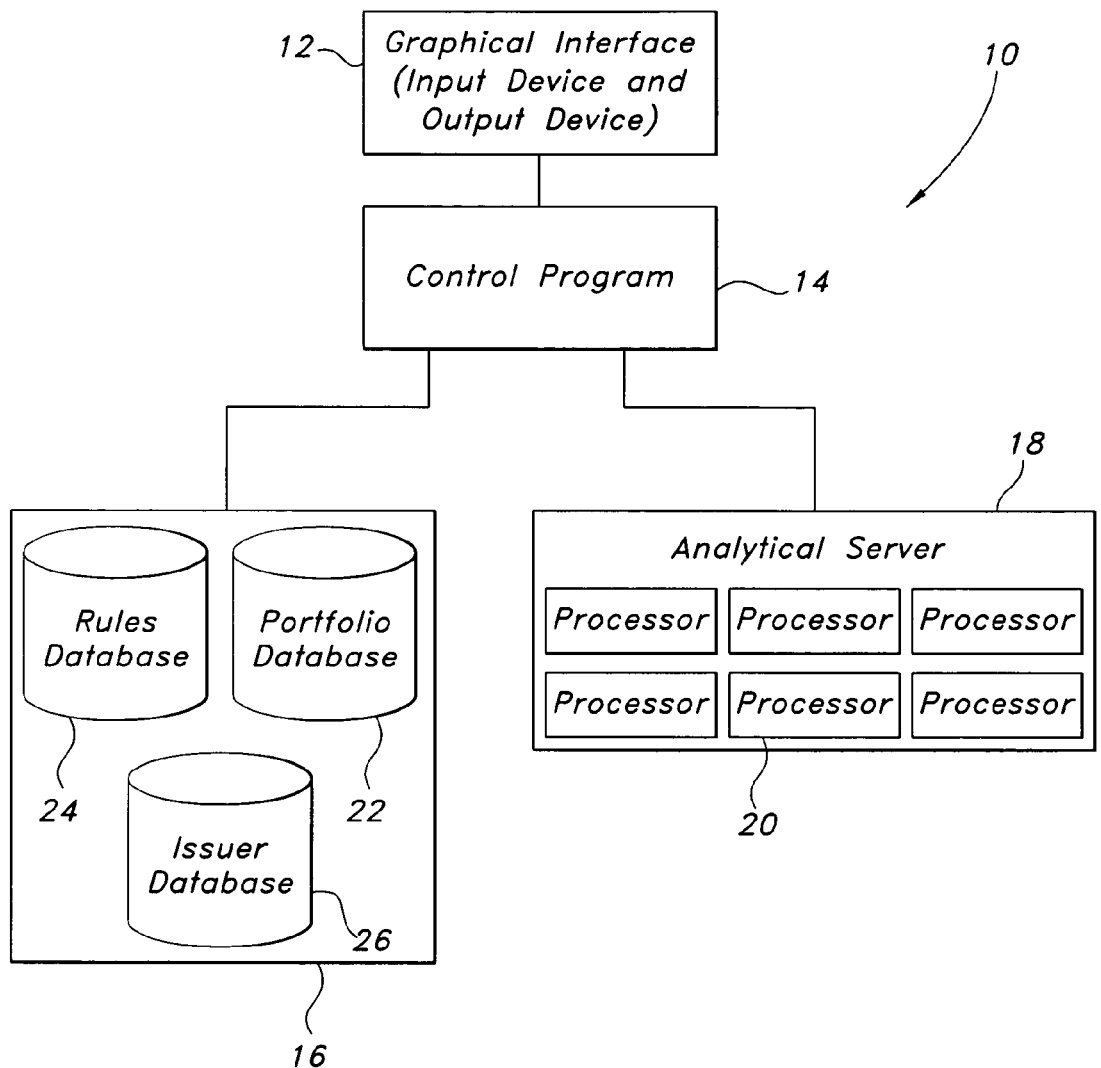
FIG. 1 is a schematic diagram depicting the core functional components of a computer-based system for managing credit risk for investment portfolios configured in accordance with a preferred embodiment of the subject invention.

Referring now to the drawings wherein like reference numerals identify similar aspects, components or features of the subject invention, there is illustrated in FIG. 1 a schematic representation of the core functional components of the computerized, web-based credit risk management system of the subject invention, which is designated generally by reference numeral 10. It should be understood that system 10 is adapted and configured to function independently while also interacting with other web-based systems such as, for example, an enterprise investment management system that features trade entry, trade settlement, cash management and payment processing tools, as well as an integrated compliance module which monitors investment decisions to ensure that the investment and portfolio composition as a whole remain in compliance with the investment objectives of a particular investor.

In particular, system 10 provides, preferably through a set of graphical user interfaces (GUI's) 12, a credit risk management system for submitting and evaluating requests for credit approval. Preferably, the graphical user interfaces (also referred to herein as "screens") used by system 10 incorporate user-friendly features and fit seamlessly with other operating system interfaces, that is, in a framed form having borders, multiple folders, toolbars with pull-down menus, embedded links to other screens and various other selectable features associated with animated graphical representations of depressible buttons. These features can be selected (i.e., "clicked on") by the user via connected mouse, keyboard, or other commonly used tool for indicating a preference in a computerized graphical interface.

With continuing reference to FIG. 1, the graphical user interfaces 12 define collectively the input and output devices for system 10, which enables portfolio managers, traders and credit analysts to receive and report data in accordance with the present invention. These devices are operatively associated with a data storage device or memory 16 and an analytical server 18. Memory 16 preferably contains a portfolio database 22 which stores a plurality of portfolios each containing fixed income securities, a rules database 24 storing a plurality of compliance rules or guidelines relating to the portfolios contained in portfolio database 22, and an issuer database 26 storing subjective and objective data about issuers of fixed income securities.

Analytical server 18 preferably includes one or more processors 20 which communicate with a control program 14. Control program 14 preferably contains an instruction set written in a conventional computing language such as HTML, C++ or Java, for coordinating the interactive relationship between memory 16, the processors 20 of server 18, and the graphical interfaces 12.

Figure 2:
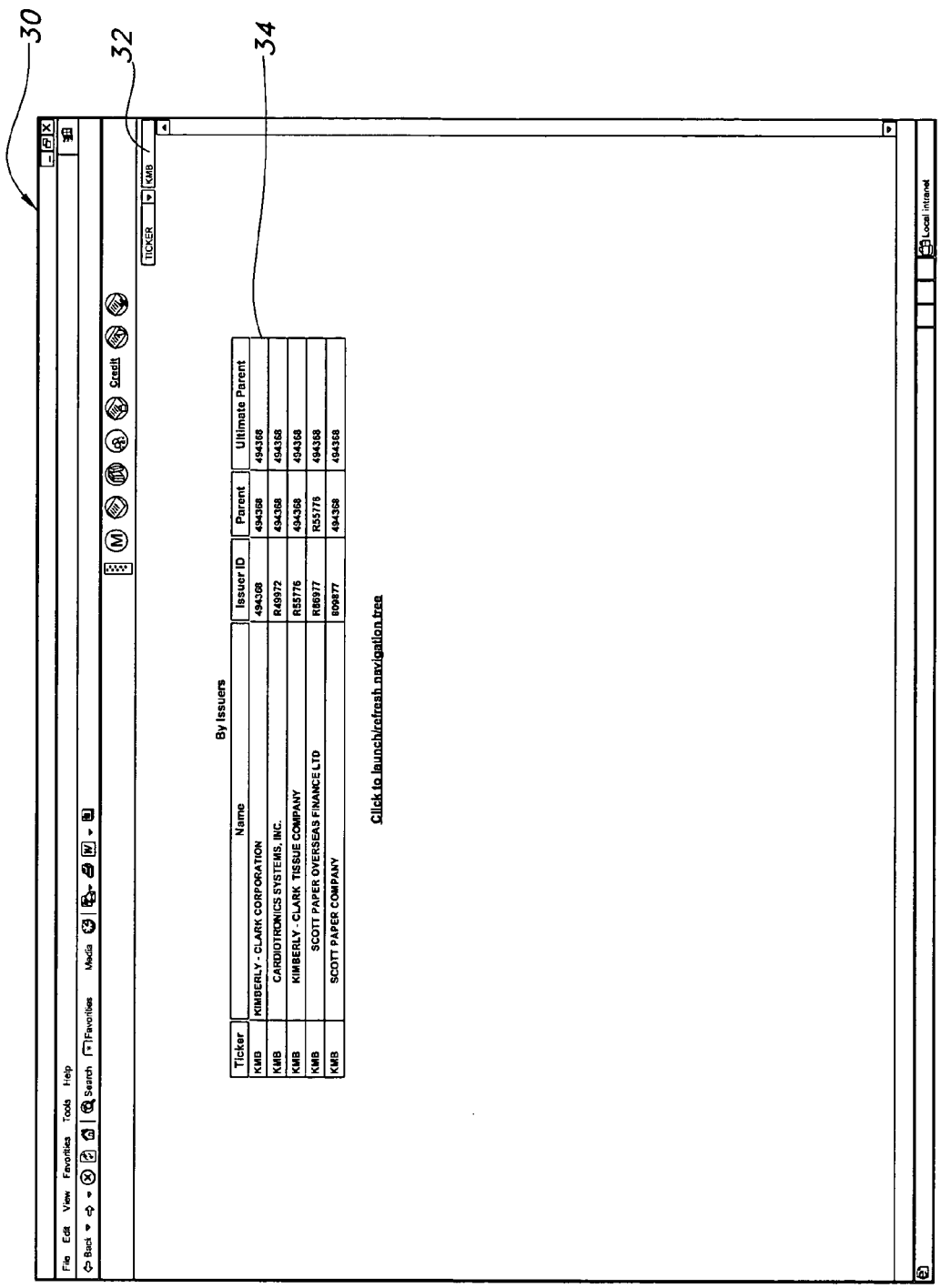
FIG. 2 is a depiction of a graphical user interface configured in accordance with a preferred embodiment of the subject invention that enables a user to enter a ticker symbol for a given issuer in a data input field to obtain tabulated information on the corporate structure and corporate relationships of the issuer from an issuer database containing objective and subjective data about issuers.

Referring to FIG. 2, there is depicted a graphical user interface screen 30 that is adapted and configured to enable a user (e.g., a credit analyst) to obtain information from issuer database 26 about an issuer of securities. The information is used to evaluate a credit approval request from a portfolio manager or trader, as will be discussed in greater detail below with respect to the process flowchart illustrated in FIG. 9. The information associated with screen 30 can be obtained in any number of ways including, for example, entering a ticker symbol for a given issuer of fixed income securities (i.e., KMB the ticker symbol for Kimberly Clarke) in data input field 32 of screen 30, or by entering an issuer identification number such as a CUSIP identifier (e.g., 484368) in the same field. The information obtained by the credit analyst is set forth in table 34 and includes data on the corporate structure (e.g., parent/subsidiary) and corporate relationships (e.g., share ownership) of the issuer.

FIG. 3 depicts a graphical user interface screen 40 that is adapted and configured to display descriptive information about the selected issuer (i.e., Kimberly-Clark Corporation). Screen 40 is accessed by selecting the "Overview" tab 42. The information displayed is obtained from the issuer database 26 and includes, for example, corporate and fiscal data in display field 44, market data such as exchange closing prices in display field 46 and credit enhancements shown in display field 48. This information is used by the credit analyst to evaluate the credit worthiness of the issuer.

Figure 4:
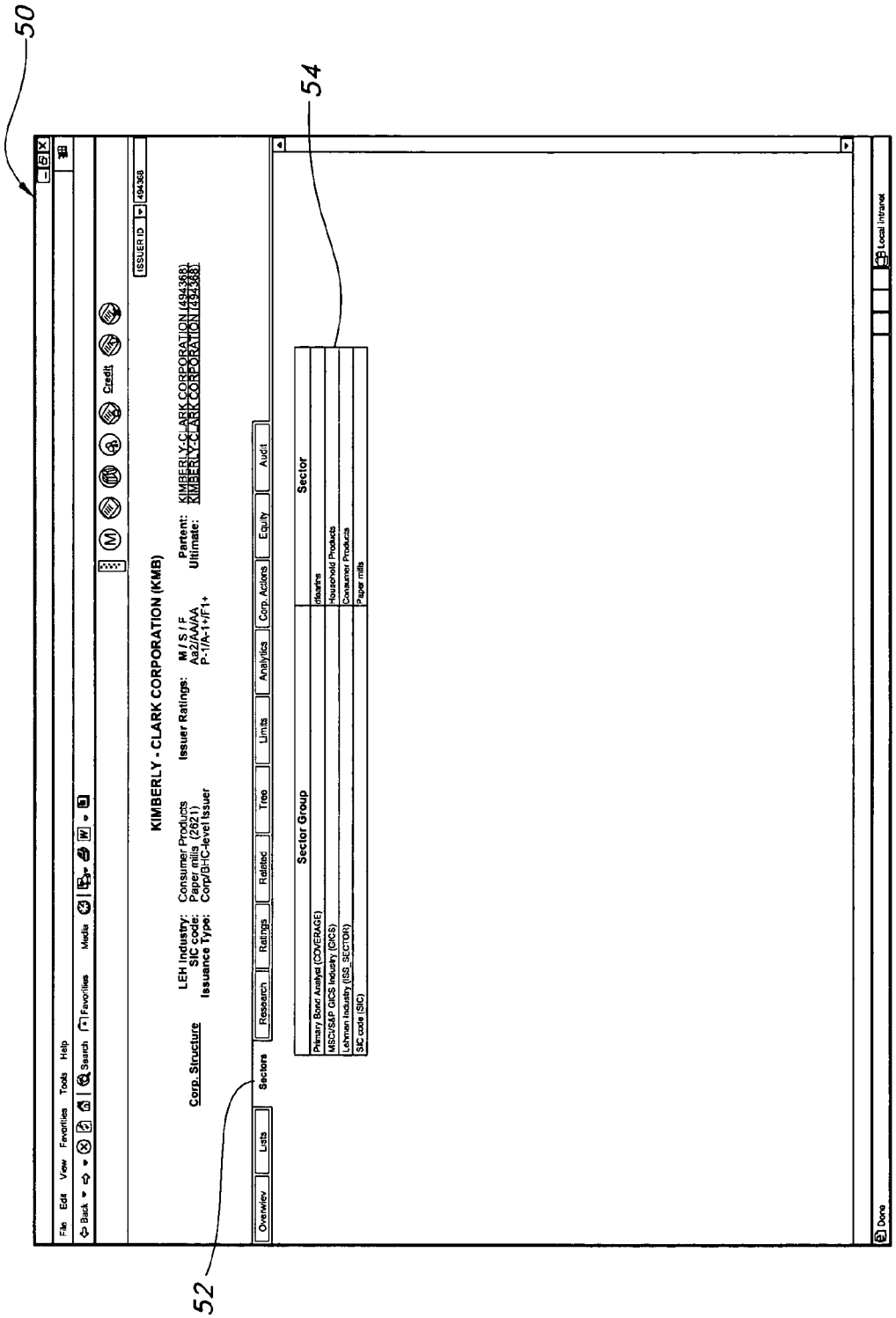
FIG. 4 is a depiction of a graphical user interface configured in accordance with a preferred embodiment of the subject invention that displays information from the issuer database regarding the industry sectors for a selected issuer.

FIG. 4 depicts a graphical user interface screen 50 that is adapted and configured to display information from the issuer database 26 regarding the industry sectors or sector groups for a selected issuer of securities. Screen 50 is accessed by selecting the "Sectors" tab 52. In the case of Kimberly-Clarke Corporation, the identified sectors displayed in table 54 of screen 50 include household and consumer products, and paper mills. This information is also used by the credit analyst to evaluate the credit worthiness of the issuer.

Figure 5:
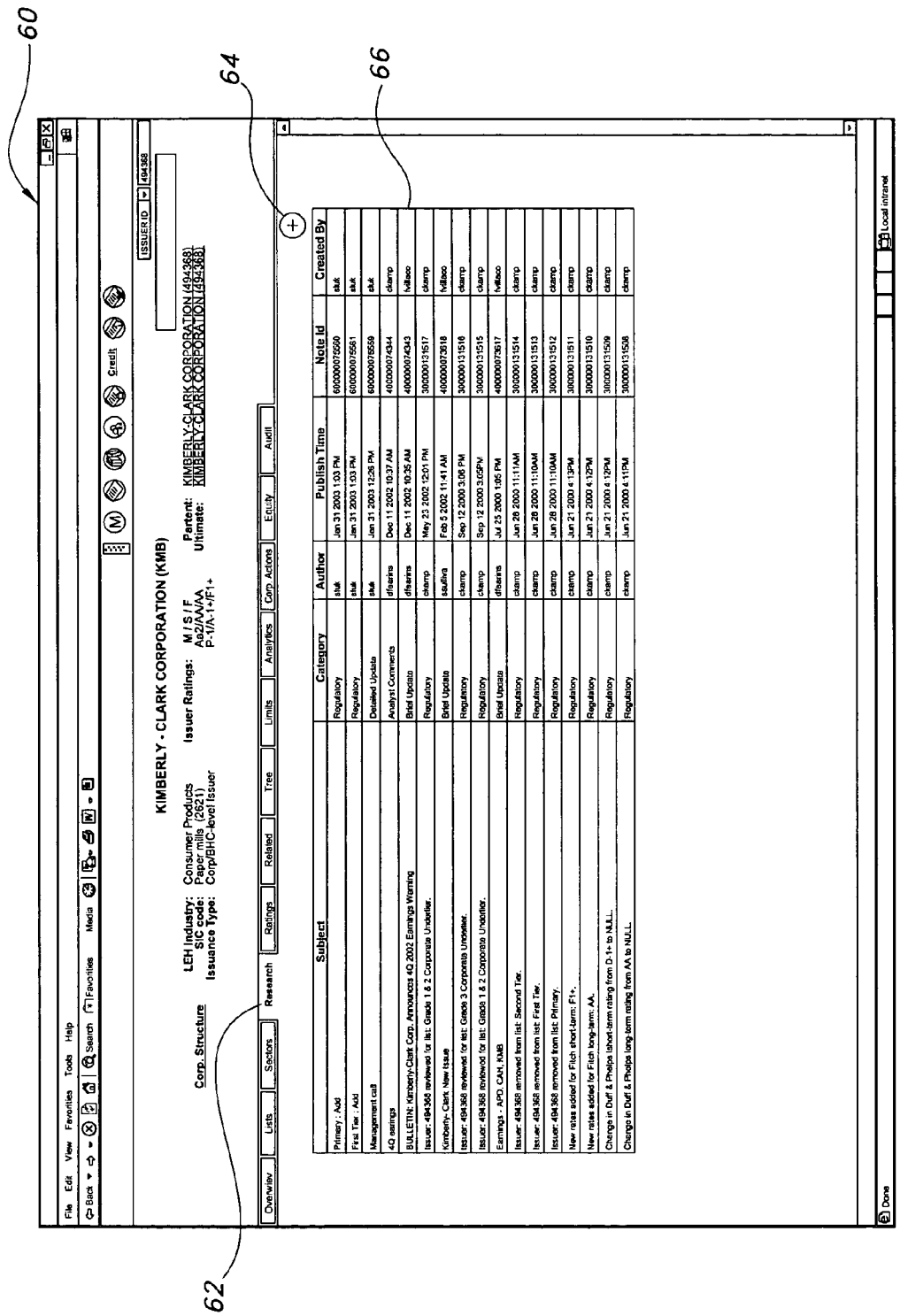
FIG. 5 is a depiction of a graphical user interface configured in accordance with a preferred embodiment of the subject invention that displays research information for a selected issuer compiled by users and stored in the issuer database.

Referring to FIG. 5, there is depicted a graphical user interface screen 60 that is adapted and configured to display research information for a selected issuer of securities that has been compiled by users and stored in the issuer database 26. This qualitative information may be accessed by selecting the "Research" tab 62. The subjective research information displayed on screen 60 is derived from the comments and/or views of various credit analysts associated with the system of the subject invention. These analyst comments can involve, for example, regulatory issues, earnings reports or credit ratings from outside agencies. In use, an analyst may select icon 64 to add a comment to table 66 using a conventional text editor. It is envisioned that the analyst comments can be linked to documents, reports or other types of attachments stored in the database that may be readily accessed by the analyst. This information is used by the credit analyst to evaluate the credit risk associated with an issuer.

Figure 6:
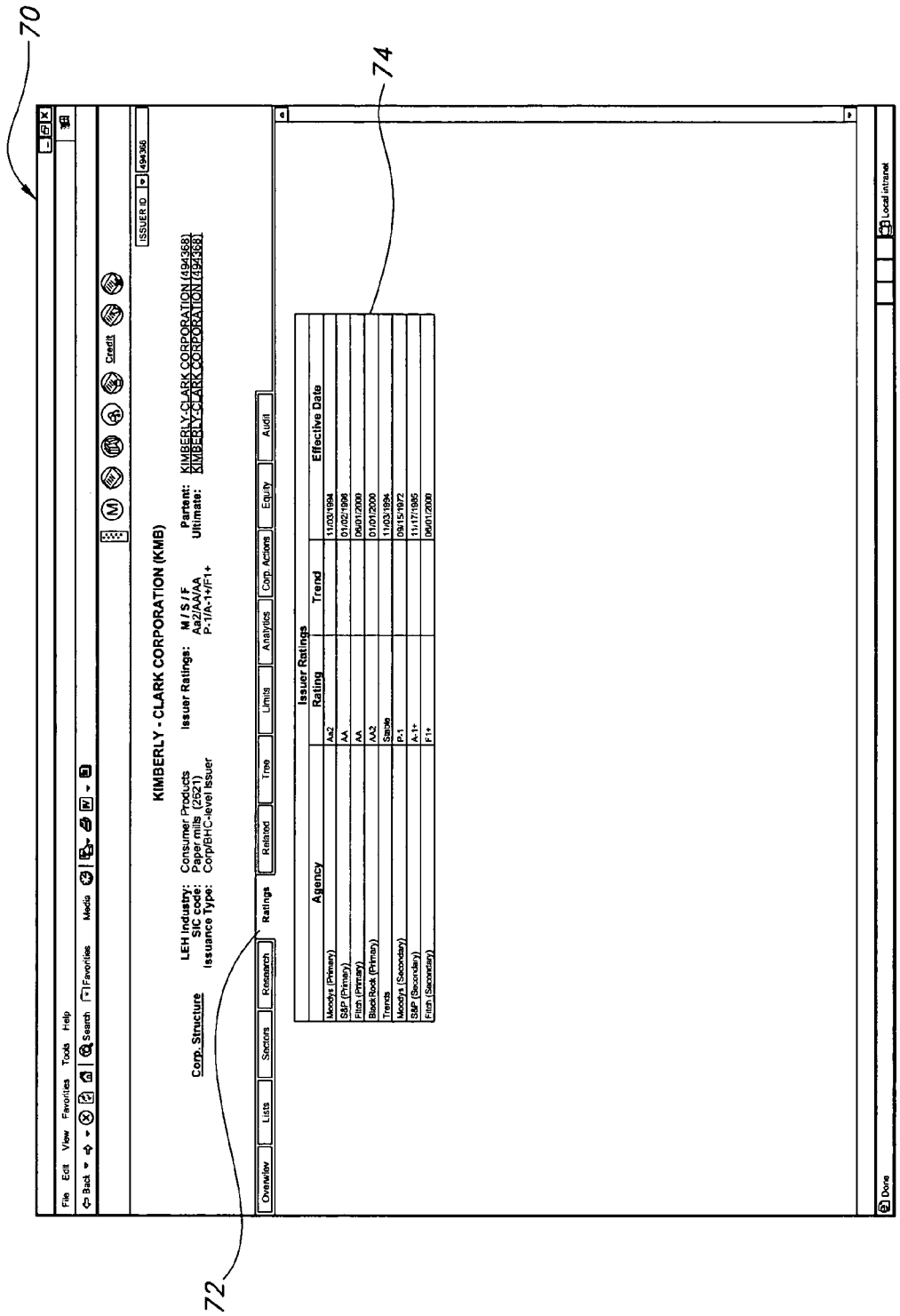
FIG. 6 is a depiction of a graphical user interface configured in accordance with a preferred embodiment of the subject invention that displays ratings information for a selected issuer that are stored in the issuer database.
Figure 7:
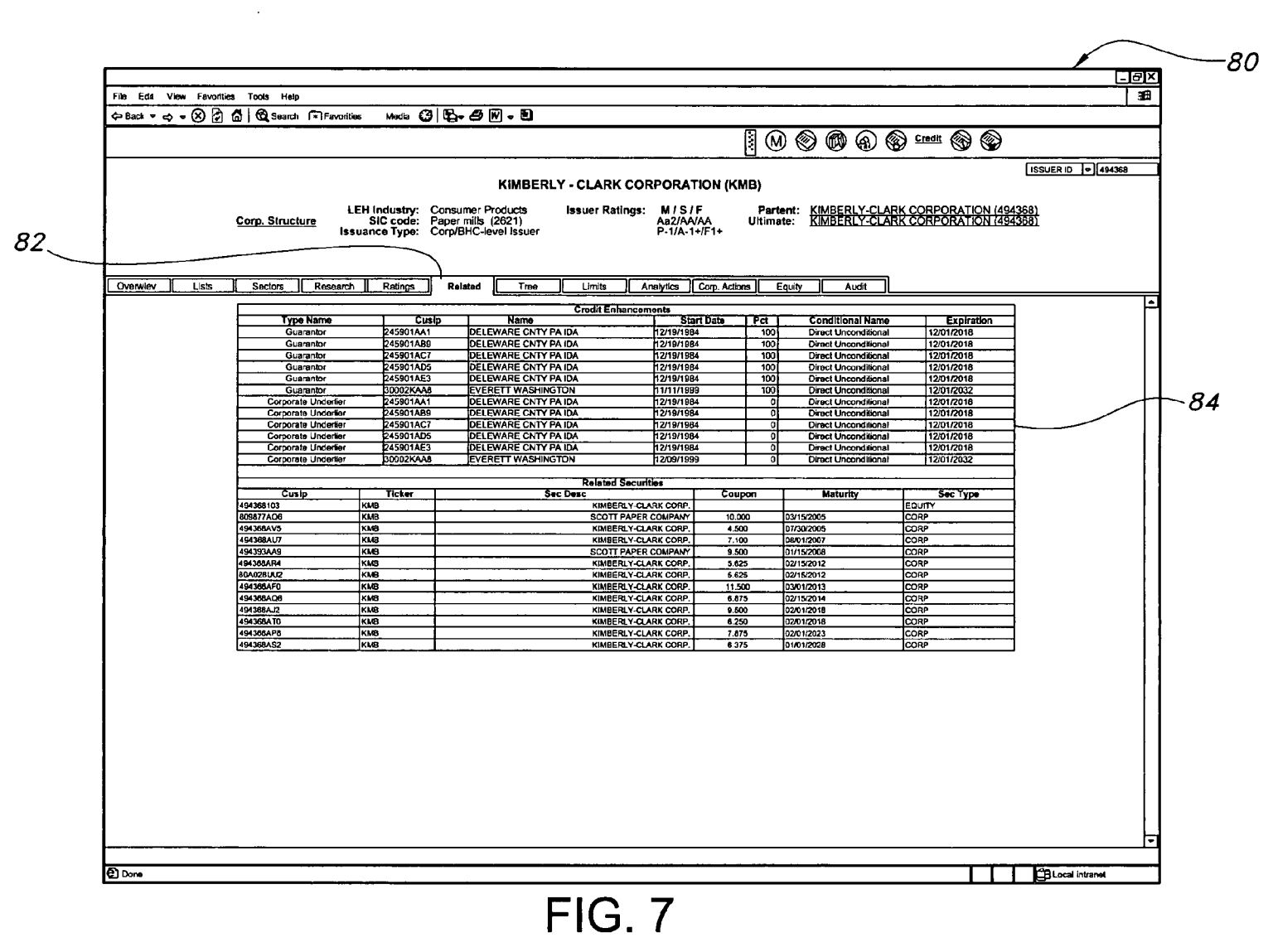

Referring to FIG. 6, there is depicted a graphical user interface screen 70 that may be accessed by a credit analyst by selecting "Ratings" tab 72, and which displays a table of ratings information 74 for a selected issuer of securities that are stored in the issuer database 26. The ratings information includes agency ratings such as, for example, Moody's, S&P and Fitch's ratings, and may be used by the credit analyst in evaluating risk. Similarly, FIG. 7 depicts a graphical user interface screen 80 that may be accessed by selecting "Related" tab 82, and which displays a table of securities 84 that are related to or issued by a selected issuer. In this case, table 84 displays securities that are related to Kimberley-Clarke Corporation, such as, for example, securities issued by Scott Paper Company. This information is also stored in issuer database 26, and may be utilized by a credit analyst to evaluate the credit worthiness of an issuer of securities.

Figure 8:
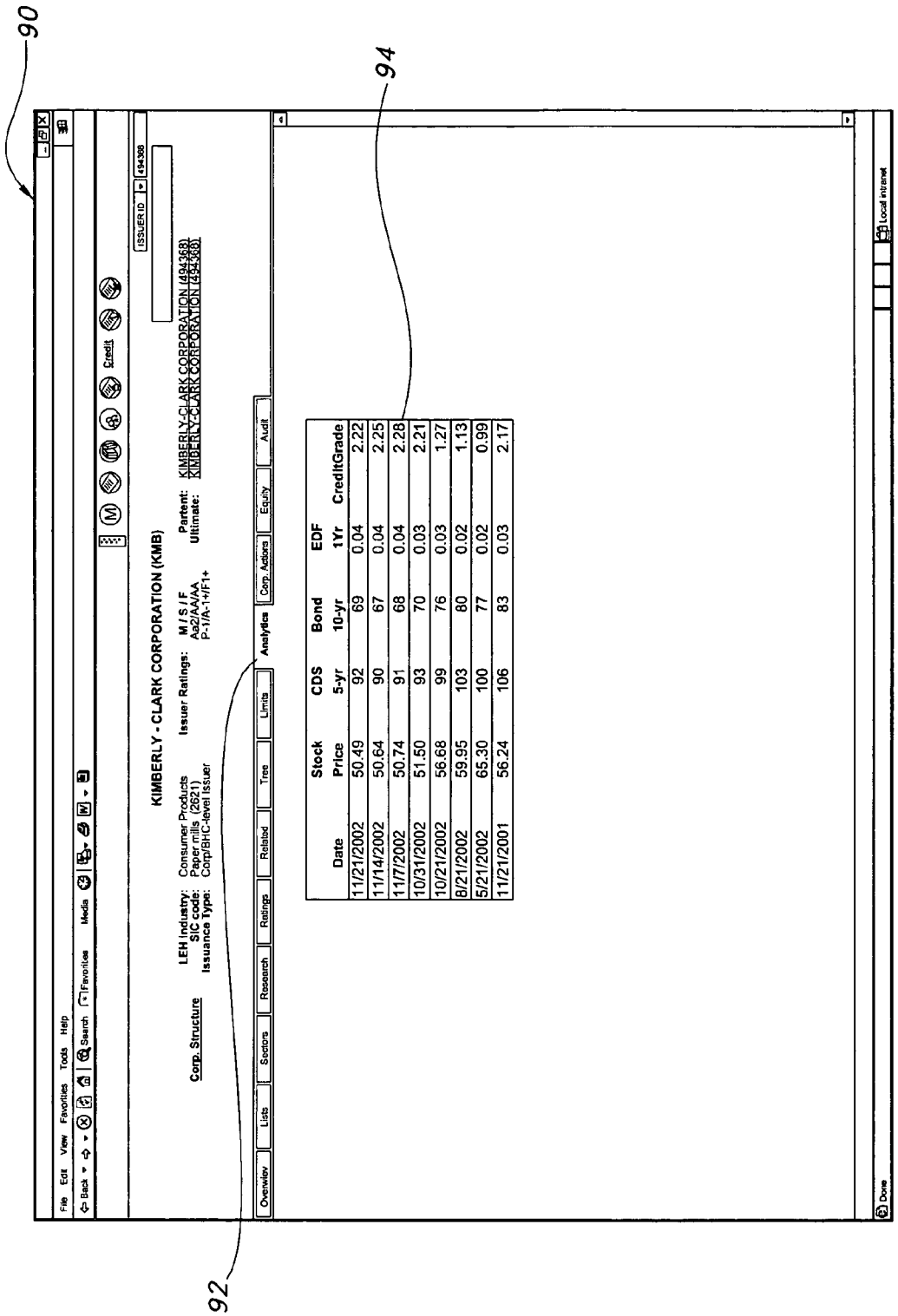
FIG. 8 is a depiction of a graphical user interface configured in accordance with a preferred embodiment of the subject invention that displays market analytics that are related to a selected issuer and that are stored in the issuer database.

FIG. 8 depicts a graphical user interface screen 90 that displays additional information in the form of market analytics for a selected issuer. This information, which is stored in issuer database 26, may be accessed by selecting "Analytics" tab 92. The information, which is displayed in table 94, provides the credit analyst with an indication of what the market thinks of a particular issuer, and includes, for example, stock prices, credit defaults swap spreads, bond yields and credit grades in a chronological order.

Figure 9:
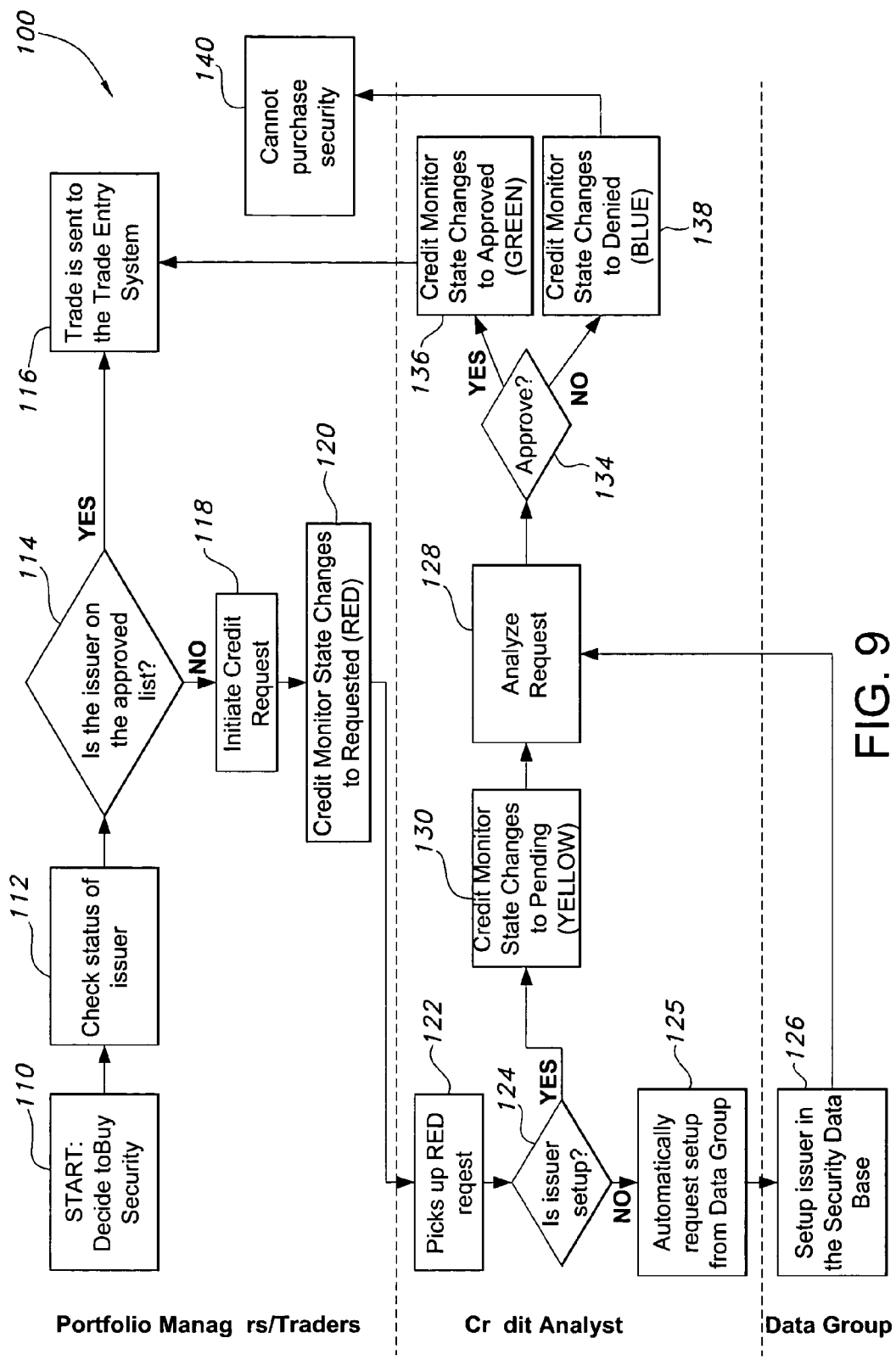
FIG. 9 is a flow chart depicting the steps in the pre-trade credit approval process of the subject invention.

Referring now to FIG. 9, there is illustrated a flow chart 100 depicting the steps in the pre-trade credit approval process of the subject invention. As illustrated, the process includes steps that are performed by three distinct parties, namely, the portfolio manager/trader, the credit analyst and the data group. Initially, at step 110, a portfolio manager/trader will decide to purchase a particular security, for example, a security issued by Kimberly-Clarke Corporation, for a portfolio contained within portfolio database 22. The portfolio has a set of compliance rules associated therewith, which are stored in rules database 24, and which provide guidelines for the purchase of securities. For example, the compliance rules may provide that securities can be added to the portfolio only if they are on the Primary and Tier I lists that are maintained by the credit management system of the subject invention.

Figure 10:
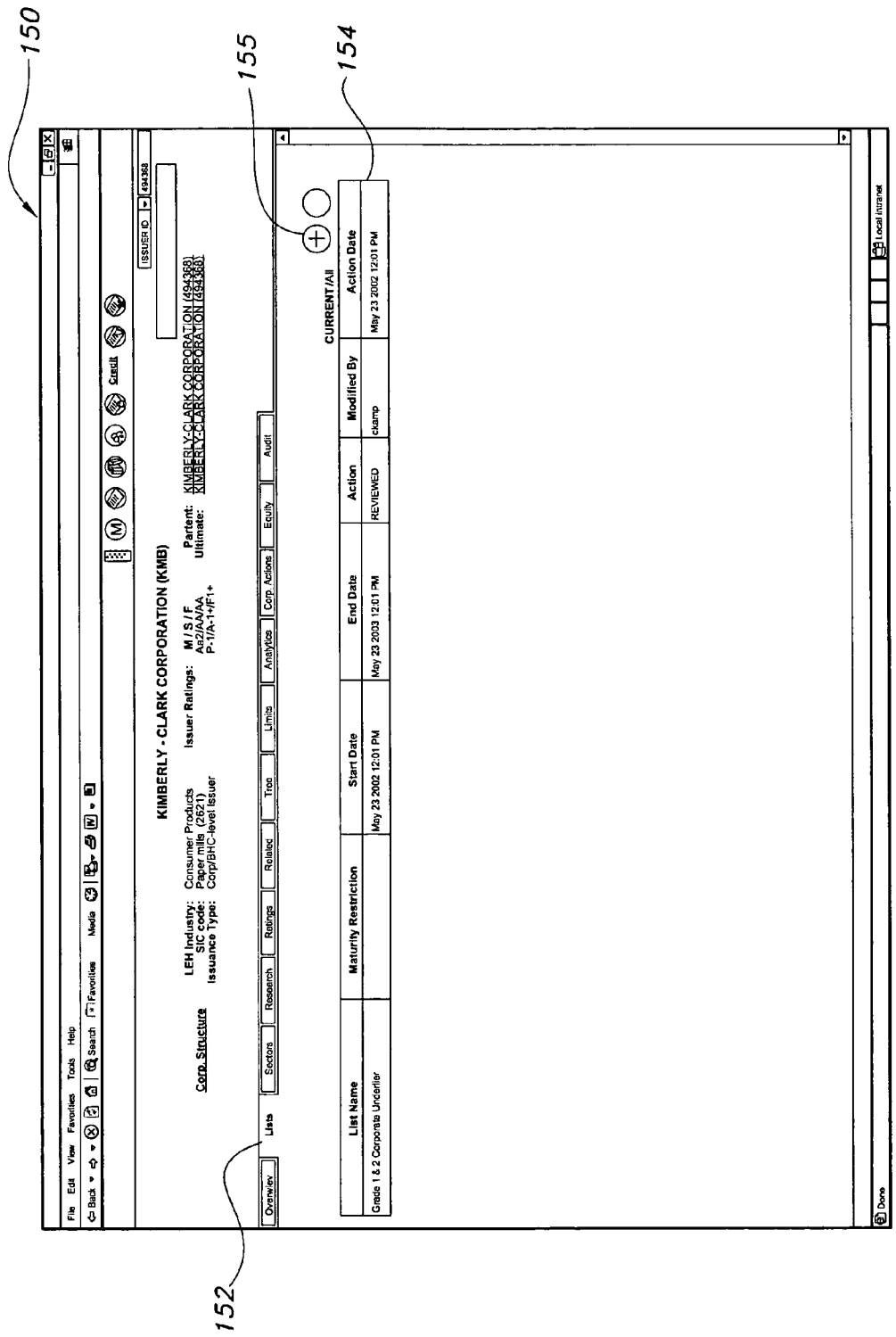
FIG. 10 is a depiction of a graphical user interface configured in accordance with a preferred embodiment of the subject invention that displays approved credit lists.
Figure 11:
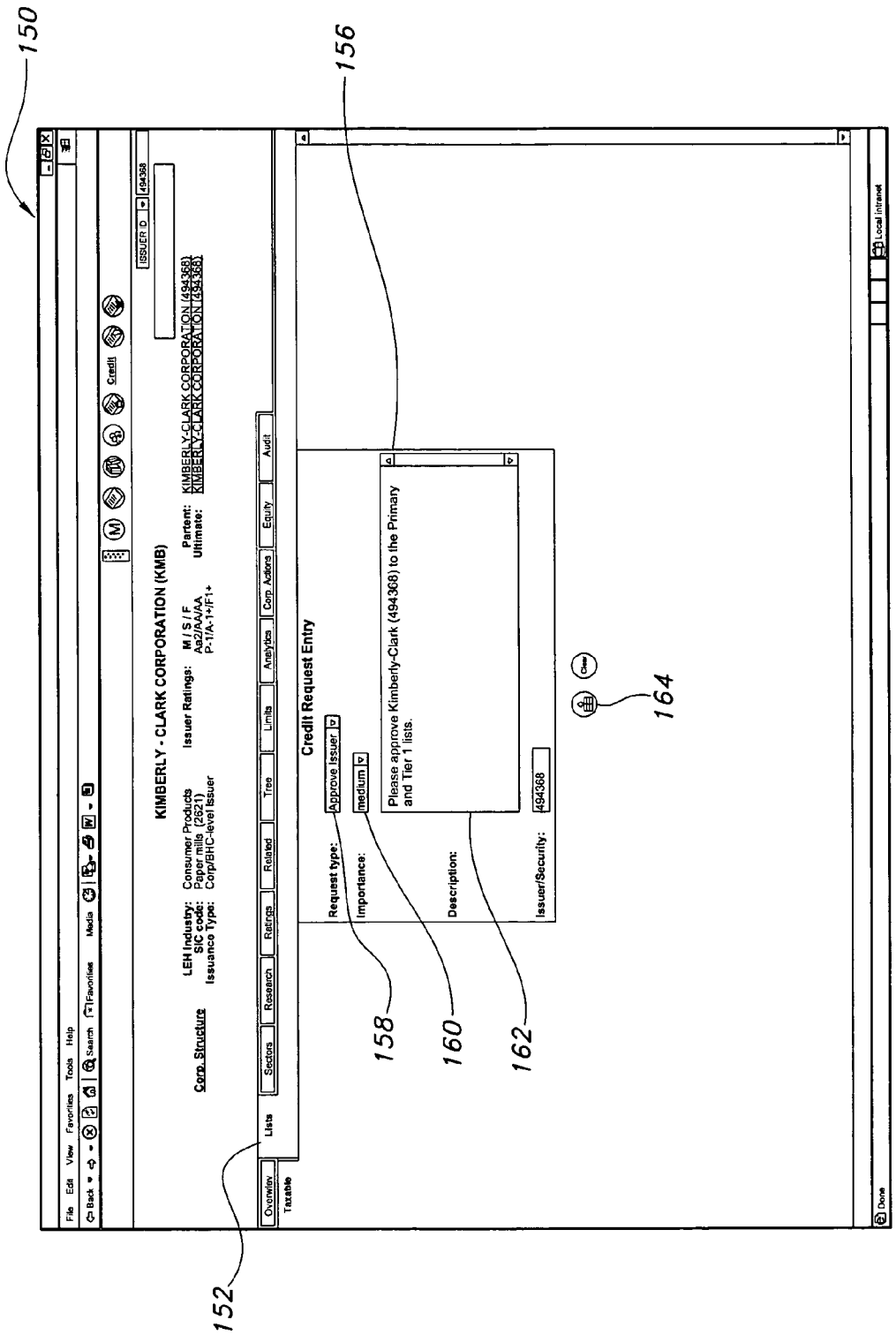
FIG. 11 is a depiction of a graphical user interface configured in accordance with a preferred embodiment of the subject invention that includes a data entry field for submitting a credit approval request for a selected issuer.

Accordingly, prior to purchasing a security using the trade entry system associated with the subject invention, the portfolio manger must check the list status of the issuer at step 112. This is accomplished, as shown in FIG. 10, by accessing graphical user interface screen 150 by way of selecting "Lists" tab 152. At such a time, a List table 154 displays the inclusive Lists under which the issuer of the securities sought to be purchased are maintained. Thus, at step 114, the portfolio manger may determine whether the issuer is maintained on a list that is in accord with the compliance rules of the portfolio.

If the issuer is on an approved list, then the portfolio manager may proceed to step 116, and send the trade to the trade entry system for execution. However, if, as in the case of the subject example, Kimberly-Clarke is only maintained under the Grade 1 & 2 Corporate Underlier list, as shown in table 154 of screen 150, the portfolio manager must initiate a credit approval request, because the compliance rules for the subject portfolio do not permit the purchase of securities that are maintained this list. Therefore, at step 118, the portfolio manager requests credit approval for Kimberly-Clarke to be added to the Primary and Tier I lists, since they are approved by the compliance rules of the portfolio.

A credit approval request in made by selecting the icon 155 on screen 150 of FIG. 10. Thereupon, a credit request entry form 156 is displayed on screen 150 which includes, among other things, a data entry field 158 for designating the type of request (e.g., Approve Issuer), a data entry field 160 for designating the relative importance of the request (e.g., high or medium), and a data entry field 162 for setting forth a detailed textual statement describing the credit approval request. Once the portfolio manager has completed request form 156, the request may be submitted to the credit analyst by selecting icon 164. Then, the request is broadcast to a credit analyst and is displayed in real-time on the Credit Monitor screen 170 depicted in FIG. 12. At this stage of the process 100, which is corresponds to step 120 in FIG. 9, the credit monitor displays the description of the request in the color Red, indicating that no action has been taken by the credit analyst.

At step 122, the credit analyst receives the credit approval request from the portfolio manager, and determines at step 124 whether the issuer is set up in the issuer database 26. That is, a determination is made as to whether the credit management system 10 of the subject invention includes information related to the issuer of interest. If the answer to this inquiry at step 124 is no, then the credit analyst will automatically request that the issuer be set up in the system at step 125. A person or group assigned to this task will then perform the steps necessary to set up the issuer in the system at step 126. Thereafter, the process will be placed back into the control of the credit analyst at step 128, whereupon, the request is analyzed based upon the subjective and objective information now stored in issuer database 26.

It is envisioned that during the period of time in which the issuer is being setup in the database at step 126, verbal approval may be given by the credit analyst to enable the portfolio manager/trader to proceed with the transaction, subject to specified restrictions. This verbal approval may be granted for a period of time, and expire automatically thereafter. An appropriate status message indicting a verbal approval would be displayed in the Credit Monitor screen 170, or in another location.

If the answer at step 124 is yes, that is, the issuer is set up in the system, then process 100 proceeds to step 130, whereupon the color-coded status of the credit approval request displayed in the Credit Monitor screen 170 is changed to Yellow. This color indicates that the status of the request is pending.

Figure 13:
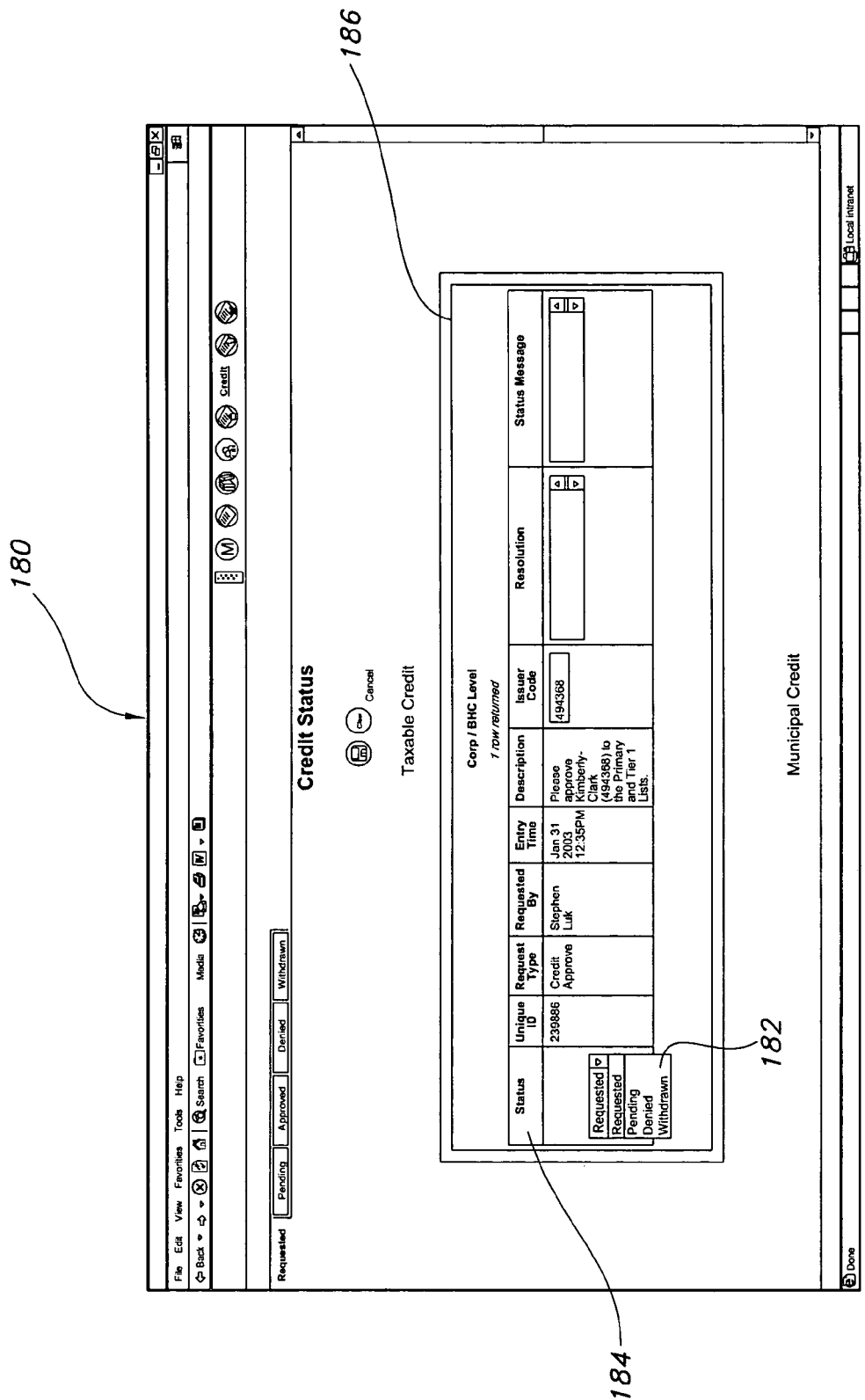
FIG. 13 is a depiction of a graphical user interface that enables an analyst to manage the status of the credit approval process, at an initial stage of the credit approval process.
Figure 14:
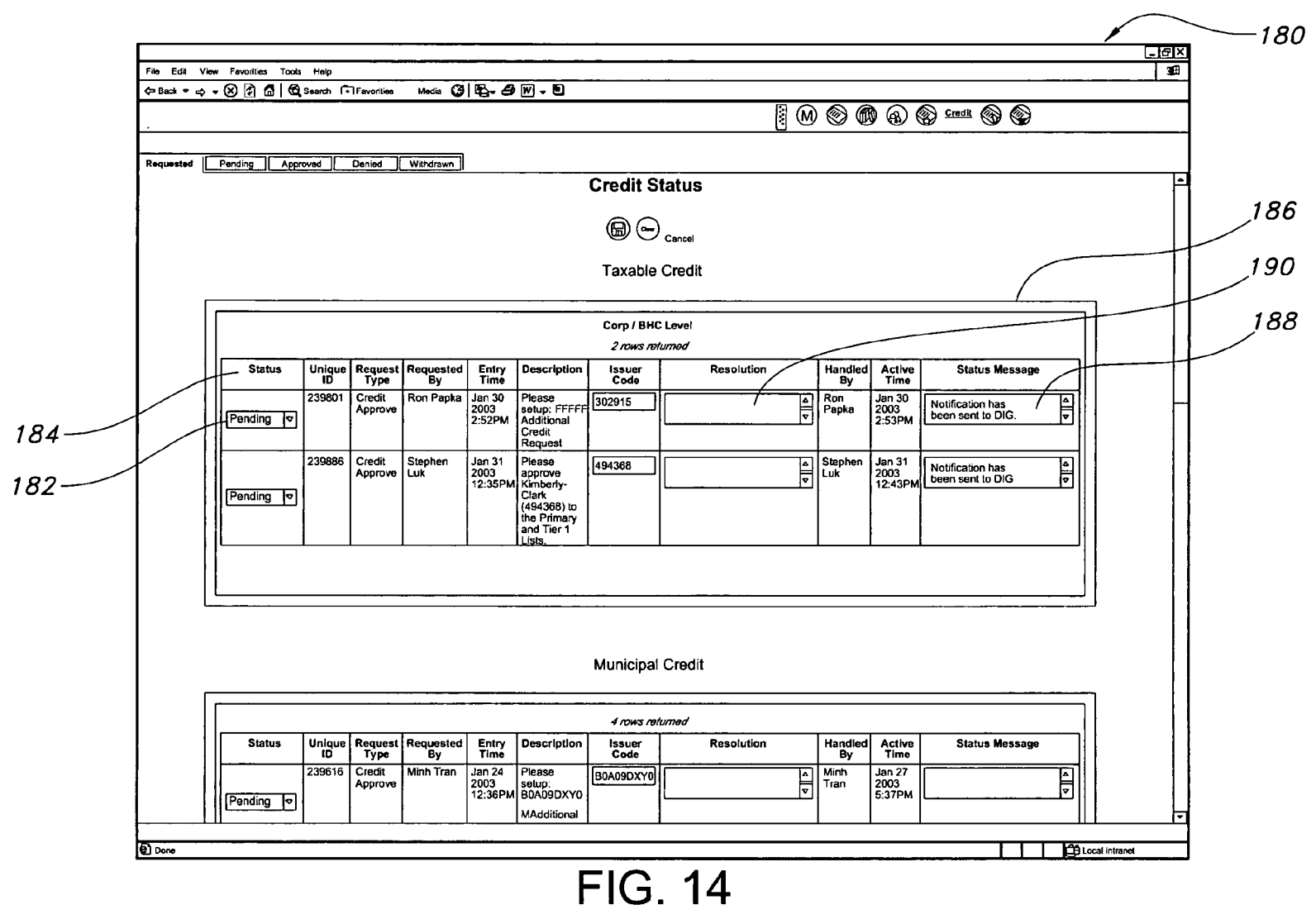

The credit analyst manages the credit approval process using the credit status screen 180 illustrated in FIG. 13. More particularly, using a pull-own menu 182 in the status column 184 of table 186, the analyst can selectively change the color-coded status of the request in Credit Monitor screen 170 by choosing between the following states: Requested, Pending, Denied, and Withdrawn. The credit status screen 180 also allows the credit analyst to manage the flow of information during the pendency of the request. For example, FIG. 14 illustrates the use of textual status messages in the status message field 188 of table 186. A resolution message field 190 is also provided on screen 180, which enables the credit analyst to present textual messages describing the resolution of the credit approval request on behalf of the portfolio manager.

With continuing reference to FIG. 9, at step 128 the credit analyst evaluates the credit worthiness of the issuer by using the information stored in issuer database 26 through the use of the graphical user interfaces shown in FIGS. 2 through 8. More particularly, the credit analyst will determine the credit risk associated with the issuer based upon the subjective and objective information stored in the issuer database 26. Once the evaluation is complete, the credit analyst will either approve or deny the request at step 134.

Figure 12:
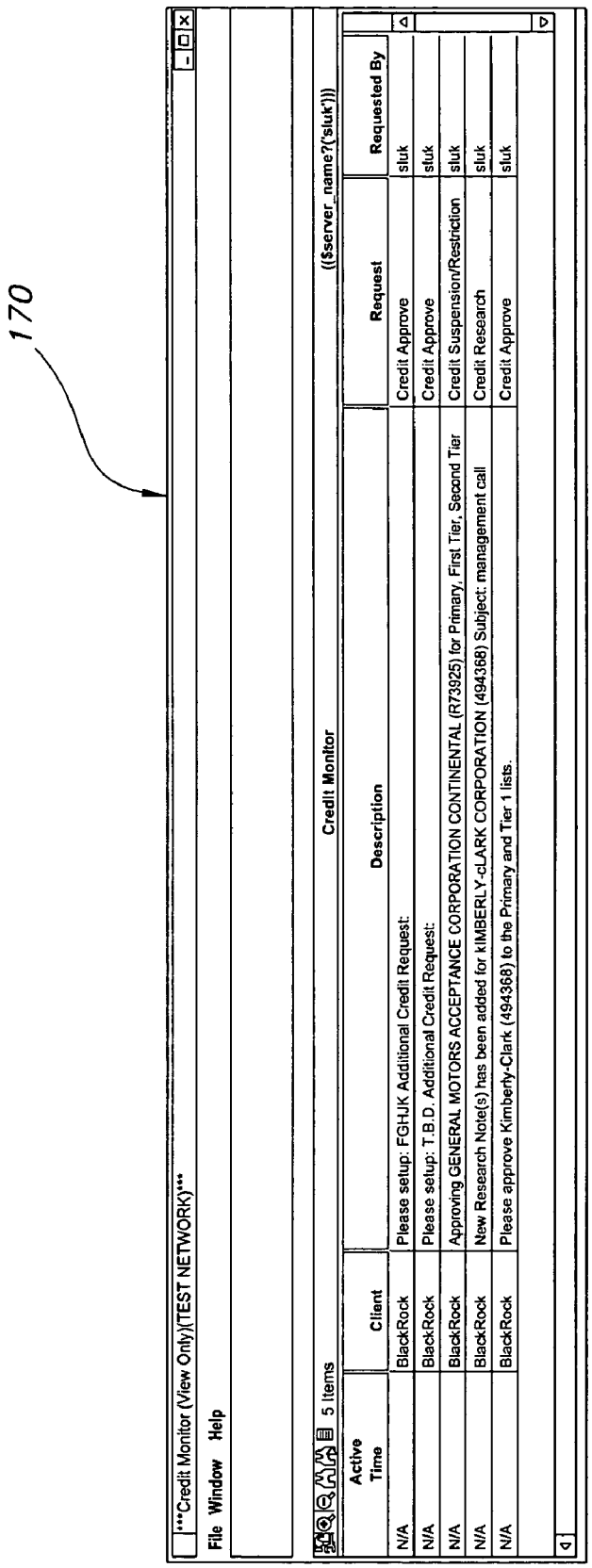
FIG. 12 is a depiction of a display screen that enables a portfolio manager to monitor the credit approval process through color-coded states.

If the request is approved, at step 136, the credit analyst changes the color-coded status message on monitor screen 170 of FIG. 12 to Green. This indicates approval of the request. If, on the other hand, the request is denied because of the credit risk involved, at step 138, the credit analyst changes the color-coded status message on monitor screen 170 of FIG. 12 to Blue. This indicates denial of the request. Consequently, at step 140, the portfolio manager will be unable to purchase the security for the subject portfolio, as this would be a purchase contrary to the investment objectives defined by the portfolio's compliance rules.

Figure 15:
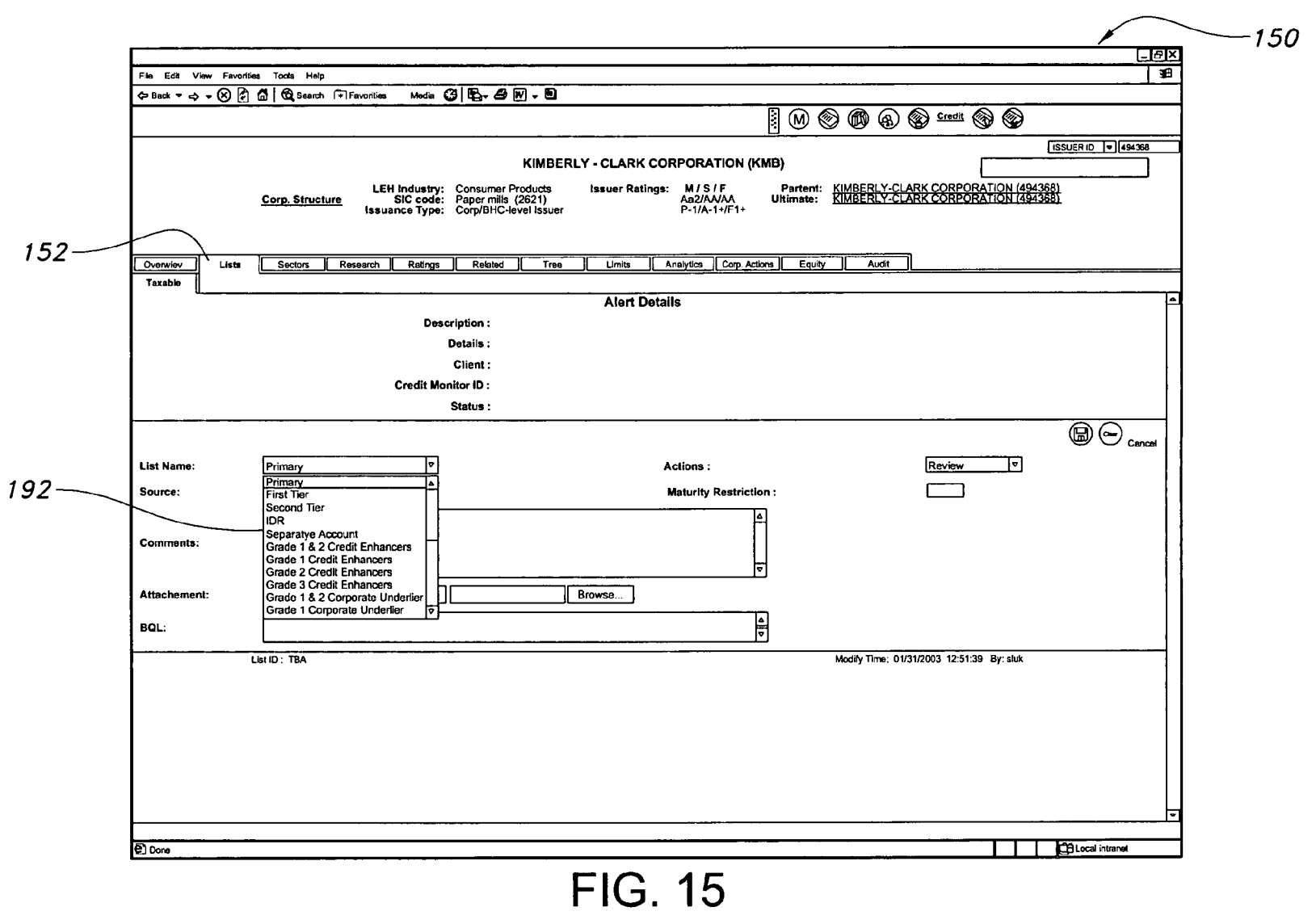
Figure 16:
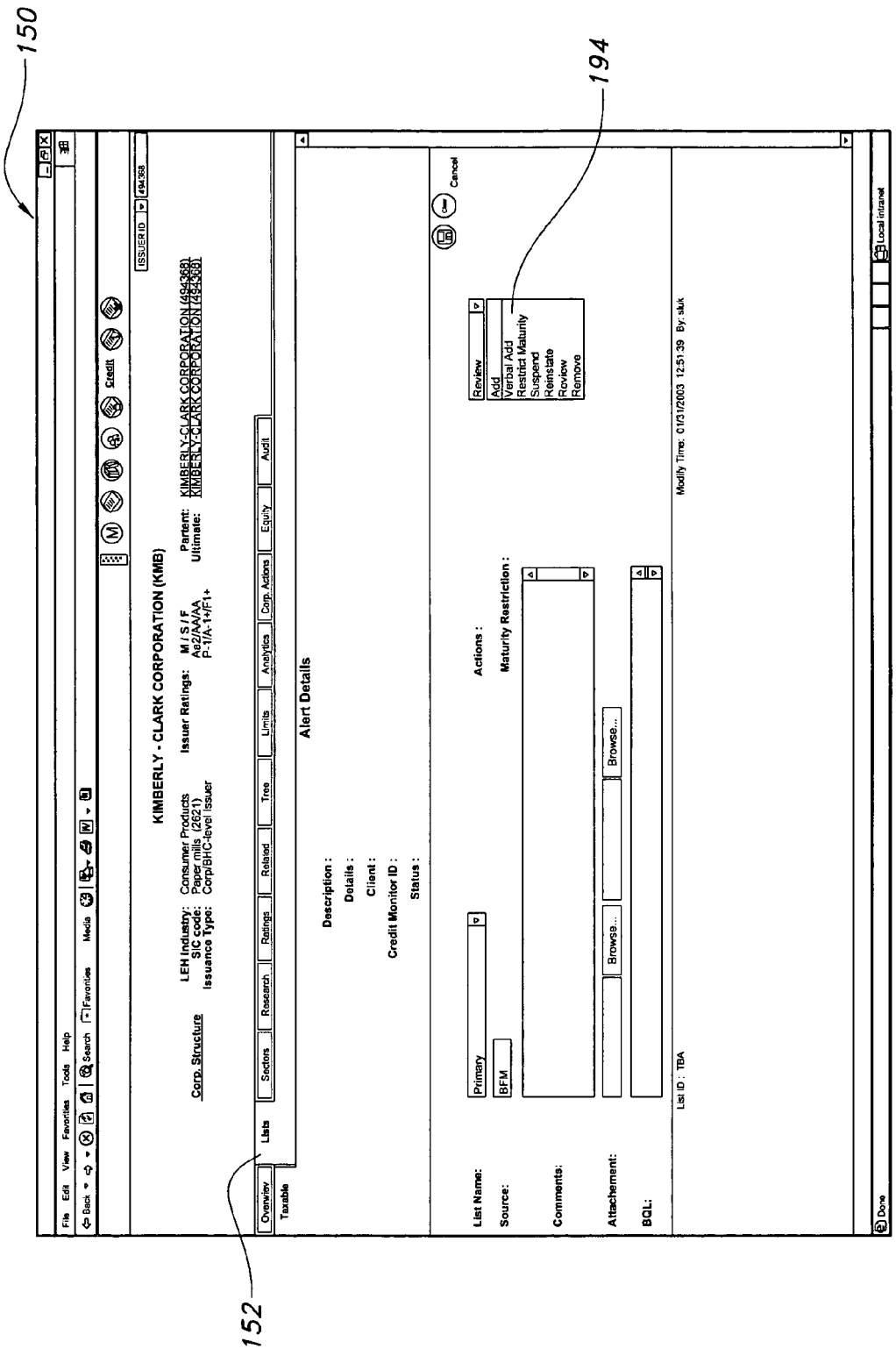
FIG. 16 is a depiction of the graphical user interface of FIG. 15 showing a pull down menu to enable an analyst to add an issuer to an approved credit list selected from a group of credit lists.

Upon approval of the request at step 134, the credit analyst selects the "Lists" tab 152 on the graphical user interface 150 of FIGS. 15 and 16, to add the issuer to the approved lists, which in this instance, are the Primary and Tier I lists. As illustrated in FIG. 15, the credit analyst resolves the request by first accessing the pull-down menu 192 to select the newly approved list(s) from a group of list names. Then, the credit analyst adds the issuer to an approved list by selecting pull-down menu 194 which contains a group of actions including: Add, Verbal Add, Restrict Maturity, Suspend, Reinstate, Review and Remove. This screen is also configured to permit the credit analyst to append comments and attach documents to the credit approval.

Figure 18:
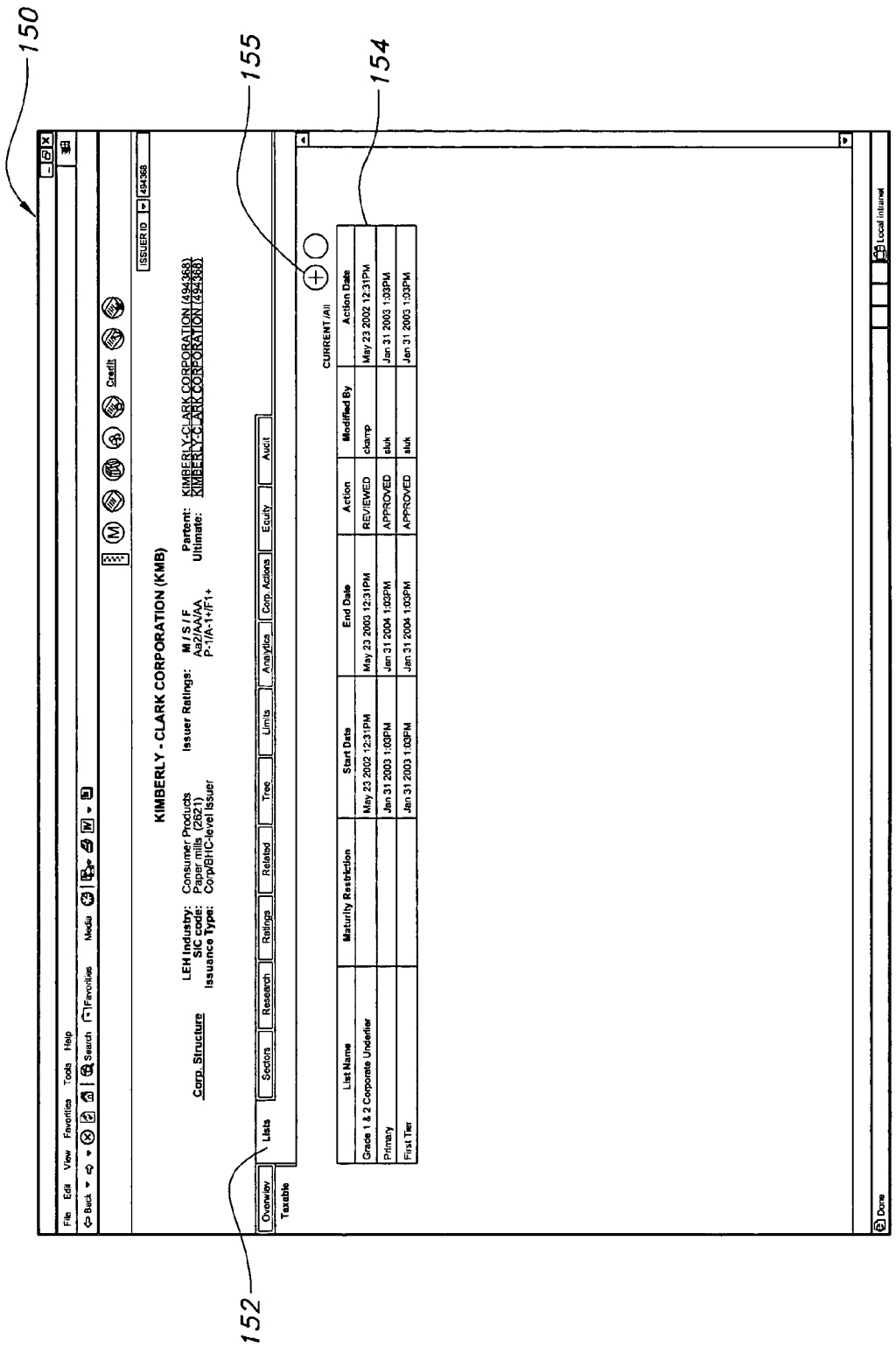
FIG. 18 is a depiction of the graphical user interface of FIG. 10 showing the two new credit lists to which the issuer has been added.

It is also possible for the credit analyst to add an issuer to multiple lists by accessing table 200 shown in FIG. 17. In this instance, the credit analyst can apply an action to multiple lists names by selecting a box in the "Apply ?" column 210 of table 200. Once the credit analyst adds an issuer to one or more approved lists using either screen of interface 150, the list name will appear in List table 154, as depicted in FIG. 18. As noted in the table, the actions taken with respect to the lists include "Reviewed" with respect to the initial Grade 1 & 2 Corporate Underlier lists and "Approved" with respect to the Primary and First Tier lists.

The credit risk management system of the subject invention is also adapted and configured to enable the credit analyst and/or portfolio manager to query historical actions performed in the system to determine the status of certain issuers with respect to a selected list name. For example, a credit analyst can determine which issuers have been suspended from the Tier I list, when such actions occurred and which credit analyst conducted the credit evaluation. Historical queries can be based on list name, action, issuer name or date.

The subject system is also adapted and configured to enable a credit analyst or portfolio manager to perform list queries to obtain all or a portion of the taxable or tax-exempt issuers in a particular list of approved issuers. The subject system is further adapted and configured to enable a credit analyst or portfolio manager to access a credit list matrix or spreadsheet, which summarizes approved taxable and tax-exempt issues.

Although the system and method of the subject invention have been described with respect to preferred embodiments, those skilled in the art will readily appreciate that changes and modifications may be made thereto without departing from the spirit and scope of the subject invention as defined by the appended claims. For example, while the graphical user interfaces described and illustrated are focused on managing credit risk with respect to issuers of fixed income securities, those skilled in the art will readily appreciate that the system of the subject invention can be readily utilized to evaluate the credit risk associated with individual securities, and this is considered well within the scope of the subject invention.

What is claimed is:

1. A system for enabling a portfolio manager to obtain credit approval for an issuer of securities from a credit analyst comprising:

a) a first database containing information regarding issuers of securities;

b) a second database containing compliance rules providing guidelines for the purchase of securities for selected portfolios;

c) means for permitting a portfolio manager to determine whether a particular issuer of securities is on a list of approved issuers for a selected portfolio based upon the compliance rules contained in the second database;

d) means for permitting the portfolio manager to submit a credit approval request, with regard to the particular issuer of securities, to a credit analyst if it is determined that the particular issuer of securities is not on a list of approved issuers for the selected portfolio;

e) means for permitting a credit analyst to evaluate the credit approval request submitted by the portfolio manager based on the issuer information contained in the first database;

f) means for permitting the credit analyst to resolve the credit approval request and transmit the resolution of the credit approval request to the portfolio manager in real time; and g) a trade entry system configured to receive a trade request from the portfolio manager and execute a purchase order for a security issued by the particular issuer of securities after credit approval has been received.

2. A system as recited in claim 1, further comprising means for broadcasting the credit approval request to the credit analyst for evaluation.

3. A system as recited in claim 1, further comprising means for providing the portfolio manager with status messages indicating the status of a credit approval request.

4. A system as recited in claim 3, wherein the means for providing the portfolio manager with status messages includes a graphical display providing color-coded status messages.

5. A system as recited in claim 1, wherein the issuer information contained in the database includes objective data and subjective data.

6. A system as recited in claim 1, wherein the means for submitting a credit approval request includes a graphical user interface having a data entry field for entering a description of the request.

7. A system as recited in claim 6, wherein the graphical user interface permits a portfolio manager to assign a degree of relative importance to the credit approval request in a data field.

8. A system as recited in claim 1, wherein the means for permitting the credit analyst to resolve the credit approval request includes a graphical user interface accessible by the credit analyst for specifying a resolution to the credit approval request in a data field.

9. A system as recited in claim 8, wherein the graphical user interface is adapted and configured to permit the credit analyst to resolve the credit approval request by adding an issuer to at least one list of approved issuers.

10. A system for enabling a portfolio manager to obtain credit approval for an issuer of securities from a credit analyst comprising:

a) means for determining whether an issuer of securities is on a list of approved issuers for a selected portfolio, based upon a set of compliance rules for guiding the purchase of securities for the selected portfolio, wherein both the list and the compliance rules are stored in a database;

b) means for submitting a credit approval request, with regard to a particular issuer of securities, to a credit analyst if it is determined that the particular issuer of securities is not on a list of approved issuers for the selected portfolio;

c) means for monitoring the status of the credit approval request in real time;

d) means for managing the status of the credit approval request; and e) means for resolving the credit approval request on behalf of the portfolio manager.

11. A system as recited in claim 10, wherein the means for submitting a credit approval request for an issuer includes a graphical user interface accessible by a portfolio manager for entering a description of the request in a data field.

12. A system as recited in claim 11, wherein the graphical user interface permits a portfolio manager to assign a degree of relative importance to the credit approval request in a data field.

13. A system as recited in claim 10, wherein the means for monitoring the status of the credit approval request includes a graphical display viewable by a portfolio manager.

14. A system as recited in claim 13, wherein the graphical display provides color-coded status messages viewable by the portfolio manager.

15. A system as recited in claim 10, wherein the means for managing the status of the credit approval request includes a graphical user interface accessible by the credit analyst for specifying the status of the credit approval request in a data field.

16. A system as recited in claim 10, wherein the means for resolving the credit approval request includes a graphical user interface accessible by the credit analyst for specifying a resolution to the credit approval request in a data field.

* * * * *